US012782104B2

(12) United States Patent
Chung et al.

(10) Patent No.: US 12,782,104 B2
(45) Date of Patent: Nov. 3, 2026

(54) ENCODER WITH LIGHT EMITTING DIODE

(71) Applicant: FORWARD ELECTRONICS CO., LTD., Taipei City (TW)

(72) Inventors: Ching-Hao Chung, Taipei City (TW); Chun-Lin Huang, Taipei City (TW); Hsiu-Chen Li, Taipei City (TW)

(73) Assignee: FORWARD ELECTRONICS CO., LTD., Taipei City (TW)

(*) Notice: Subject to any disclaimer, the term of this patent is extended or adjusted under 35 U.S.C. 154(b) by 204 days.

(21) Appl. No.: 18/761,469

(22) Filed: Jul. 2, 2024

(65) Prior Publication Data

US 2025/0076023 A1 Mar. 6, 2025

(30) Foreign Application Priority Data

Aug. 29, 2023 (TW) ................................ 112132530

(51) Int. Cl.
*G01B 7/30* (2006.01)
*G06F 3/02* (2006.01)
*G06F 3/0362* (2013.01)

(52) U.S. Cl.
CPC ............. *G01B 7/30* (2013.01); *G06F 3/0202* (2013.01); *G06F 3/0362* (2013.01)

(58) Field of Classification Search
CPC ....... G01B 7/30; G06F 3/0202; G06F 3/0362; H01H 13/12; H01H 13/14; H01H 13/20
See application file for complete search history.

(56) References Cited

U.S. PATENT DOCUMENTS

| | | | | |
|---|---|---|---|---|
| 3,619,594 | A * | 11/1971 | Morez | F16D 1/06 74/553 |
| 10,514,784 | B2 * | 12/2019 | Choi | B60K 35/10 |
| 10,698,489 | B1 * | 6/2020 | Beyhs | G06F 3/016 |
| 11,907,441 | B1 * | 2/2024 | Goh | G10K 11/16 |
| 12,411,565 | B2 * | 9/2025 | Boulos | G06F 3/016 |
| 2002/0024336 | A1 * | 2/2002 | Desbiolles | G01D 5/2457 324/207.2 |
| 2005/0236263 | A1 * | 10/2005 | Mazur | H01H 19/025 200/310 |
| 2012/0175231 | A1 * | 7/2012 | Chung | H01H 25/06 200/316 |
| 2021/0018994 | A1 * | 1/2021 | Wang | G06F 3/04842 |

FOREIGN PATENT DOCUMENTS

| | | |
|---|---|---|
| TW | 528856 B | 4/2003 |
| TW | M409422 U | 8/2011 |

* cited by examiner

*Primary Examiner* — Giovanni Astacio-Oquendo
(74) *Attorney, Agent, or Firm* — BACON & THOMAS, PLLC

(57) ABSTRACT

An encoder with a light emitting diode includes: a light emitting diode, a switch module, an encoder module and a control shaft. The switch module includes an insulating base having a terminal part, a conductive elastic piece and a pressing driving body. The conductive elastic piece is disposed in the insulating base, and is disposed above the terminal part. The pressing driving body is disposed in the insulating base and is disposed above the conductive elastic piece for accommodating the light emitting diode. At least part of the encoder module is disposed in the insulating base, and the encoder module includes a magnetic sensor, a magnetic ring and a rotating driving body. The control shaft passes through a penetration hole of the rotating driving body, and is disposed above the pressing driving body.

14 Claims, 8 Drawing Sheets

ENCODER WITH LIGHT EMITTING DIODE

CROSS-REFERENCE TO RELATED APPLICATIONS

This application claims the benefits of the Taiwan Patent Application Serial Number 112132530, filed on Aug. 29, 2023, the subject matter of which is incorporated herein by reference.

BACKGROUND

Field of the Invention

The present disclosure relates to an encoder and, more particularly, to an encoder with a light emitting diode, or an encoder with both a light emitting diode and a key switch, which is applicable to electronic products, such as but not limited to stereo systems, sound mixing engineering equipment, audio and video equipment, etc.

Description of Related Art

Encoders are usually used in electronic products to provide encoding signals, such as high and low voltage signals.

In addition, for general electronic products, such as but not limited to stereo systems, sound mixing engineering equipment, and audio and video equipment, they usually have a control shaft, with which the switch function of the switch equipment of the electronic products can be achieved by pressing the control shaft. In order to enhance the function of the switch equipment of the electronic products, encoders are often installed on the switch equipment, so that the switch equipment has the switch function and encoding function at the same time.

However, in situations where the lighting is relatively dim, such as when the switch device of the audio and video equipment is to be used in movie theaters or homes with the lights are turned off due to the use of the audio and video equipment, it is necessary to have lights as a guide. In the prior art, light emitting diodes are placed on the substrate of the aforementioned electronic products to generate light. However, when being placed on the substrate, the light emitting diodes need to match the position of the aforementioned encoder. Therefore, the integration in the height and brightness of the light emitting diodes is difficult. Moreover, when disposing light emitting diodes, the number of steps in the manufacturing process will also increase. For example, additional soldering processes must be added to dispose the light emitting diodes on the substrate, so that the process time will increase and the cost will also increase.

Furthermore, the encoders currently installed in switch devices are usually contact encoders, which require using brushes to contact metal contacts to generate pulse signals, and the switch modules containing light emitting diodes also use brushes to contact metal contacts for electrification, which may easily cause wearing and tearing, resulting in shortening the service life of the product.

Therefore, it is desired to provide an improved encoder with a light emitting diode so as to alleviate and/or obviate the above problems.

SUMMARY

An object of the present invention is to provide an encoder with a light emitting diode that may use a non-contact magnetic sensor to avoid the problem that the service life of the product is reduced due to wearing caused by brush contact in the prior art. In addition, the encoder of the present invention may be equipped with a light emitting diode to meet the personalized needs of different users. Moreover, the encoder of the present invention may be combined with a switch function. Through the cooperation of the control shaft and the pressing driving body, the electrical contact of the switch may be triggered without interfering with the light emitting diode, thereby improving the service life and quality of the product.

To achieve the object, the present disclosure provides an encoder, which comprises: a light emitting diode; a switch module, including: an insulating base having a main chamber and a terminal part; a conductive elastic piece accommodated in the main chamber and disposed above the terminal part; and a pressing driving body accommodated in the main chamber and disposed above the conductive elastic piece, and provided with an accommodation portion for accommodating the light emitting diode; an encoder module at least partially accommodated in the main chamber, and provided with a magnetic sensor, a magnetic ring, and a rotating driving body having a penetration hole; and a control shaft passing through the penetration hole and disposed above the pressing driving body.

Other novel features of the disclosure will become more apparent from the following detailed description when taken in conjunction with the accompanying drawings.

DETAILED DESCRIPTION OF EMBODIMENT

Figure 1:
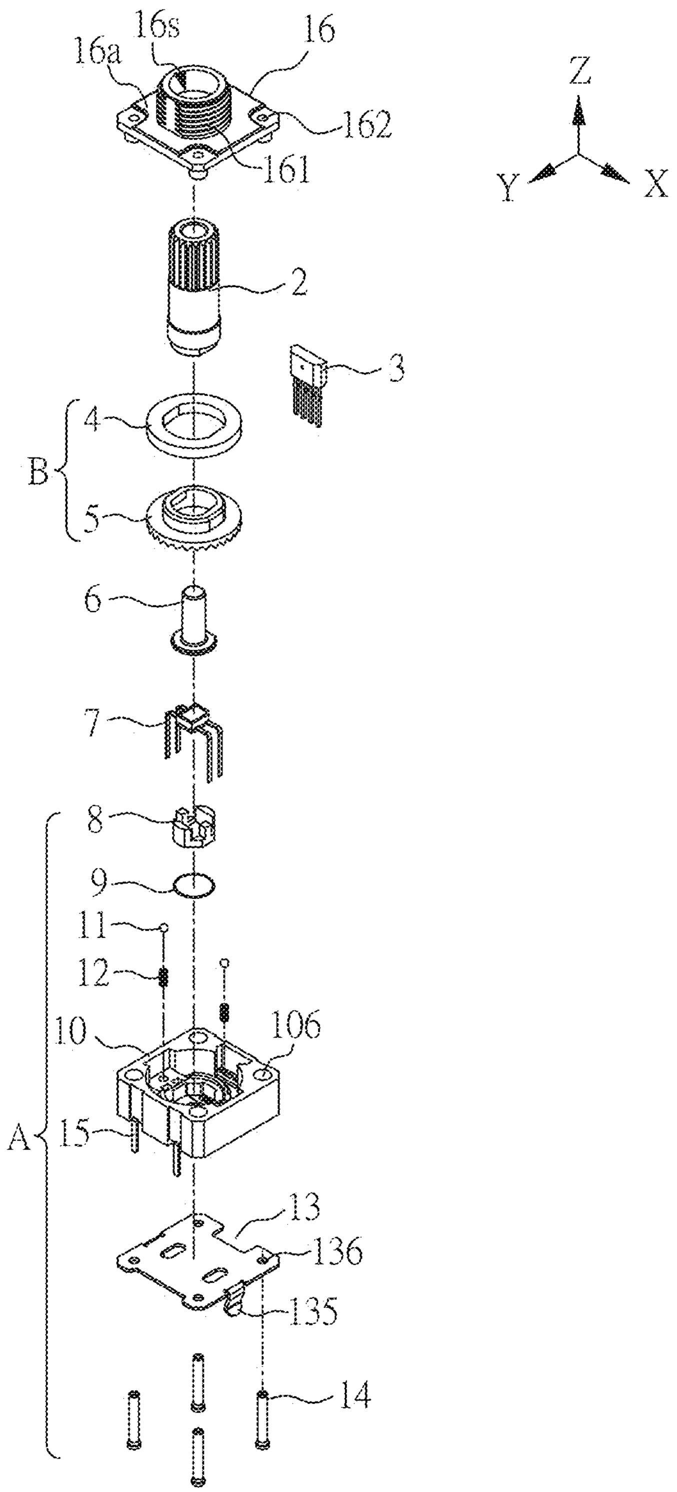
FIG. 1 is an exploded view of an encoder with a light emitting diode according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that encoder device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "substantially" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

Furthermore, the term "a given range is from a first value to a second value" or "a given range is within a range from the first value to the second value" means that the given range includes the first value, the second value and other values therebetween.

It should be understood that, according to the disclosed embodiments, an optical microscope (OM), a scanning electron microscope (SEM), a film thickness profilometer ($\alpha$-step), an ellipsometer thickness gauge, or other suitable means may be used to measure the depth, thickness, width or height of each component, or the spacing or distance between components. According to some embodiments, a scanning electron microscope may be used to obtain a cross-sectional structure image including the components to be measured, and measure the depth, thickness, width or height of each component, or the spacing or distance between components.

It should be noted that the following embodiments may be replaced, reorganized, and mixed to complete other embodiments without departing from the spirit of the present disclosure. As long as the features of the various embodiments do not violate the spirit of the invention or conflict with each other, they can be mixed and matched arbitrarily.

Unless otherwise defined, all terms (including technical and scientific terms) used herein have the same meaning as commonly understood by one of ordinary skill in the art to which this disclosure belongs. It may be understood that these terms, such as those defined in commonly used dictionaries, should be interpreted as having meanings consistent with the background or context of the related technology and the present disclosure, and should not be interpreted in an idealized or overly formal manner, unless otherwise specified in the embodiments of the present disclosure.

In addition, the term "adjacent" in the specification and claims is used to describe mutual proximity, and does not necessarily mean mutual contact.

In addition, the descriptions such as "when" or "during" in the present disclosure represent aspects such as "now, before or after", and are not limited to situations that occur at the same time, which is described first here. In the present disclosure, similar descriptions such as "arranged on" refer to the corresponding positional relationship between the two components, and do not limit whether there is contact between the two components, unless otherwise specified, which is described here first. Furthermore, when the present disclosure discloses multiple functions, if the word "or" is used between the functions, it means that the functions may exist independently, but it does not exclude that multiple functions may exist simultaneously.

In addition, the terms "electrically connected" or "coupled" in the specification and claims do not only refer to a direct electrical connection with another component, but also refer to an indirect electrical connection with another component. Electrical connection includes direct electrical connection, indirect electrical connection, or communication between two components through wireless signals.

Please refer to FIG. 1, which is an exploded view of an encoder 1 with a light emitting diode according to an embodiment of the present disclosure.

As shown in FIG. 1, the encoder 1 with a light emitting diode of the present disclosure mainly includes: a switch module A, an encoder module B, a control shaft 2 and a light emitting diode 7. The switch module A may include a pressing driving body 8, a conductive elastic piece 9, an insulating base 10 and a terminal part 15. The encoder module B may include a magnetic sensor 3, a magnetic ring 4 and a rotating driving body 5. For convenience of explanation, the Z direction is used below as the normal direction of the encoder 1 with a light emitting diode. In addition, the relative relationships such as "top", "bottom", "above" or "below" of components in the following refer to positions relative to the Z direction.

Figure 2A:
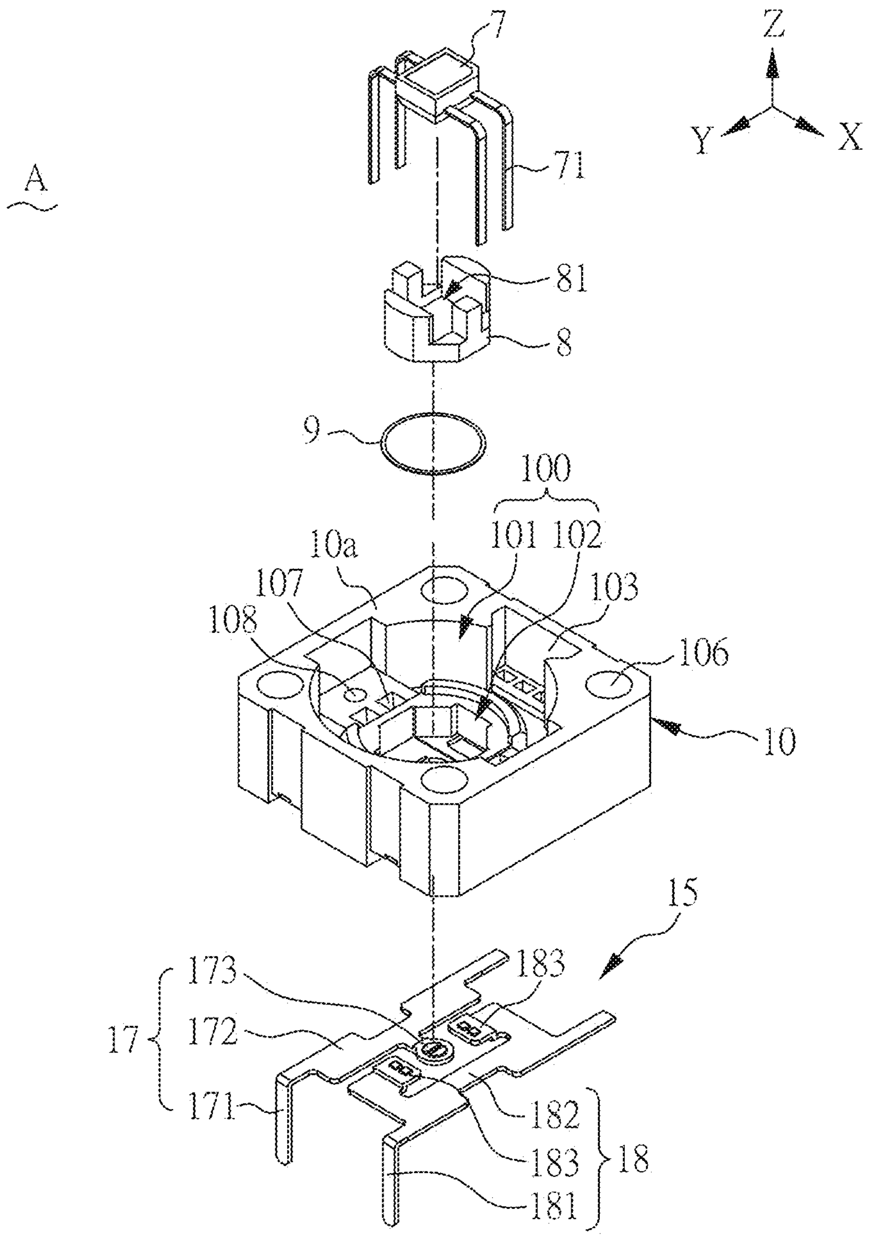
FIG. 2A is a detailed exploded view of a switch module according to an embodiment of the present disclosure.
Figure 2B:
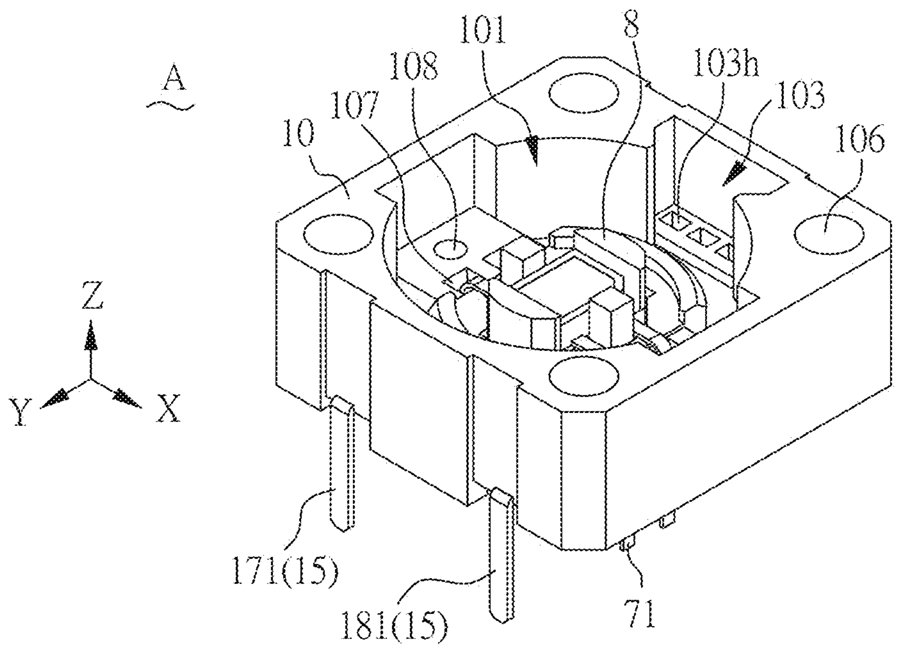
FIG. 2B is a schematic diagram illustrating a switch module and a light emitting diode after assembly according to an embodiment of the present disclosure.
Figure 2C:
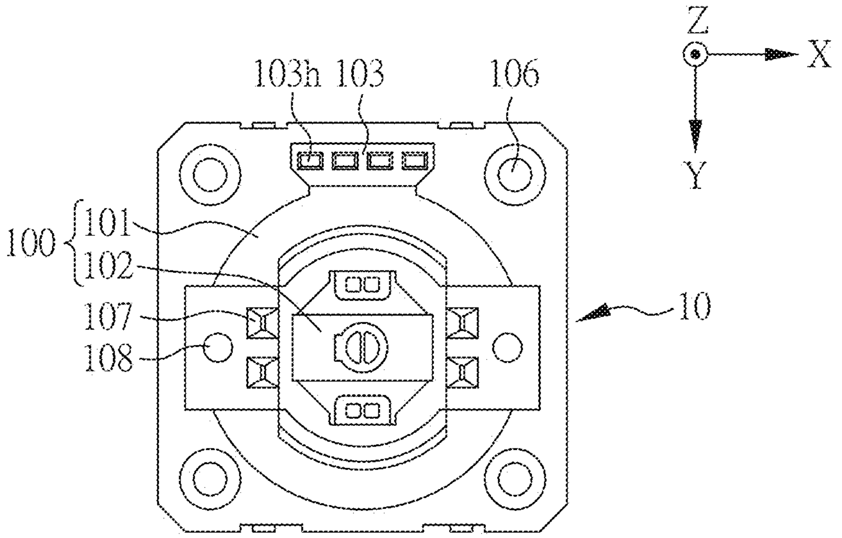
FIG. 2C is a top view of an insulating base according to an embodiment of the present disclosure.

First, the switch module A will be described. Please refer to FIG. 1 to FIG. 2C at the same time. FIG. 2A is a detailed exploded view of the switch module A according to an embodiment of the present disclosure, and FIG. 2B is a schematic diagram illustrating a switch module A and a light emitting diode 7 after assembly according to an embodiment of the present disclosure. FIG. 2C is a top view of the insulating base 10 according to an embodiment of the present disclosure.

As shown in FIG. 1, FIG. 2A and FIG. 2C, the insulating base 10 may have a main chamber 100. For example, an upper surface 10*a* of the insulating base 10 is recessed with the main chamber 100, and the main chamber 100 includes a first sub-chamber 101 and a second sub-chamber 102, wherein, in the Z direction, the lower portion of the second sub-chamber 102 may be connected to the first sub-chamber 101, and the projection of the first sub-chamber 101 in the Z direction may surround the projection of the second sub-chamber 102 in the Z direction. The first sub-chamber 101 and the second sub-chamber 102 have different sizes and/or shapes. For example, the first sub-chamber 101 may correspond to (for example, may be slightly larger than or equal to) the size and/or shape of the rotating driving body 5 of the encoder module B, so that the rotating driving body 5 may be accommodated in the first sub-chamber 101. Moreover, for example, the second sub-chamber 102 may correspond to the size and/or shape of the pressing driving body 8, so that the pressing driving body 8 may be accommodated therein, but it is not limited thereto.

In one embodiment, the insulating base 10 may also have a side chamber 103. In a horizontal direction (such as +/−X direction, +/−Y direction or other directions perpendicular to the Z direction), the side chamber 103 is adjacent to the first sub-chamber 101. The side chamber 103 may correspond to the size and/or shape of the magnetic sensor 3 of the encoder module B, so that the magnetic sensor 3 may be accommodated therein. However, the quantity thereof may be changed or the range thereof may be adjusted according to the specifications of different sensors.

There may be a terminal part 15 inside the insulating base 10. The terminal part 15 may be disposed at the bottom of the main chamber 100, but it is not limited thereto. Furthermore, the terminal part 15 may, for example, include a first terminal 17 and a second terminal 18, wherein the first terminal 17 and the second terminal 18 are not connected to each other.

In one embodiment, the first terminal 17 may include an insertion portion 171, a connection portion 172 and a contact portion 173, wherein the insertion portion 171 is connected to the connection portion 172 with a bend between the two portions, and the contact portion 173 extends from the connection portion 172. In one embodiment, the insertion portion 171 may extend along the −Z direction, the contact portion 173 may extend along the X direction, and the connection portion 172 may extend along the Y direction, while it is not limited thereto. The second terminal 18 may include an insertion portion 181, a connection portion 182 and a contact portion 183, wherein the insertion portion 181 is connected to the connection portion 182 with a bend between the two portions, and the contact portion 183 may extend from the connection portion 182. In one embodiment, the insertion portion 181 may extend along the −Z direction, the contact portion 183 may extend along the −X direction, and the connection portion 182 may extend along the Y direction, while it is not limited thereto. In one embodiment, the contact portion 173 of the first terminal 17 and the contact portion 183 of the second terminal 18 may have different shapes and may be located at different heights (for example, different heights in the Z direction), while it is not limited thereto.

The conductive elastic piece 9 may be accommodated in the second sub-chamber 102 and disposed above the terminal part 15. For example, the conductive elastic piece 9 may be accommodated in the second sub-chamber 102 and disposed at the contact portion 173 of the first terminal 17 and above the contact portion 183 of the second terminal 18. The conductive elastic piece 9 may be an arc-shaped conductive elastic piece or other non-planar conductive elastic piece, which may be squeezed by an external force to change its shape or position, and may resume to its original shape or position when the external force is removed.

The pressing driving body 8 may be accommodated in the second sub-chamber 102 of the main chamber 100, and is disposed above the conductive elastic piece 9. The pressing driving body 8 itself may have an accommodation portion 81, and the accommodation portion 81 may correspond to the shape of the light emitting diode 7, so as to accommodate the light emitting diode 7. It should be noted that, when the light emitting diode 7 is accommodated in the accommodation portion 81, the height of the light emitting diode 7 in the Z direction is not higher than the upper edge of the pressing driving body 8, so the light emitting diode 7 is not exposed at the upper edge of the pressing driving body 8, and thus, when an external force is applied toward the pressing driving body 8, it may avoid interference to the light emitting diode 7. In addition, the insulating base 10 may have at least one second accommodation portion 107 and, when the light emitting diode 7 and the pressing driving body 8 are installed on the insulating base 10, the second accommodation portion 107 may be used to accommodate the pins 71 of the light emitting diode 7, but it is not limited thereto.

In one embodiment, the switch module A may further include at least one steel ball 11 and at least one spring 12 (as shown in FIG. 1). The insulating base 10 may have at least a third accommodation portion 108. The third accommodation portion 108 may be used to accommodate the steel ball 11 and the spring 12 and, in the Z direction, the steel ball 11 is disposed above the spring 12. The functions of the steel ball 11 and the spring 12 will be explained in subsequent paragraphs.

In addition, in one embodiment, the switch module A may be assembled with a fixing plate 13 (as shown in FIG. 1), wherein the fixing plate 13 has a lead 135 so that the body of the encoder may be positioned on the counterpart, such as but not limited to a PCBA (not shown), but it is not limited thereto.

As shown in FIG. 2B, after the assembly of the switch module A is completed, the pressing driving body 8 may be disposed in the second sub-chamber 102 (please refer to FIG. 2A), and the insertion portion 171 of the first terminal 17 and the insertion portion 181 of the second terminal 18 may be exposed at the bottom of the switch module A. In addition, when the light emitting diode 7 is accommodated in the pressing driving body 8, the pins 71 of the light emitting diode 7 may be exposed at the bottom of the switch module A. In addition, when the magnetic sensor 3 is accommodated in the side chamber 103, the pins 31 of the magnetic sensor 3 may be exposed to the bottom of the switch module A via the through holes 103*h* in the side chamber 103. As a result, when the switch module A is disposed on a circuit board, the insertion portions 171, 181, the lead 135, and/or the pins 31, 71 may be electrically connected to the contacts on the circuit board, while it is not limited thereto.

Accordingly, the switch module A can be understood.

Next, the encoder module B will be described. Please refer to FIG. 1 and FIG. 3A to FIG. 3C at the same time, wherein FIG. 3A is a detailed structural diagram of the encoder module B and the control shaft 2 according to an embodiment of the present disclosure, FIG. 3B is a schematic diagram of the combined magnetic ring 4, rotating driving body 5 and control shaft 2 according to an embodiment of the present disclosure, and FIG. 3C is a top view of the encoder module B according to an embodiment of the present disclosure.

Figure 3A:
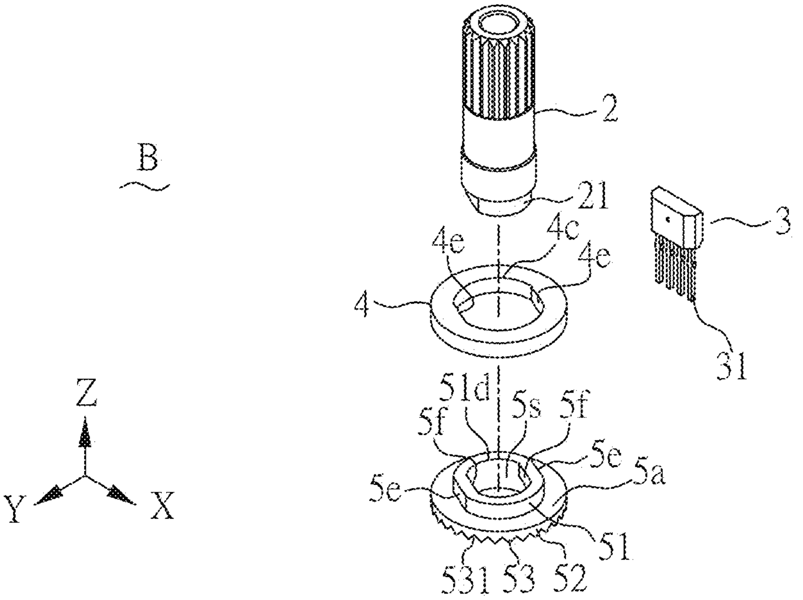
FIG. 3A is a detailed structural diagram of an encoder module and a control shaft according to an embodiment of the present disclosure.
Figure 3B:
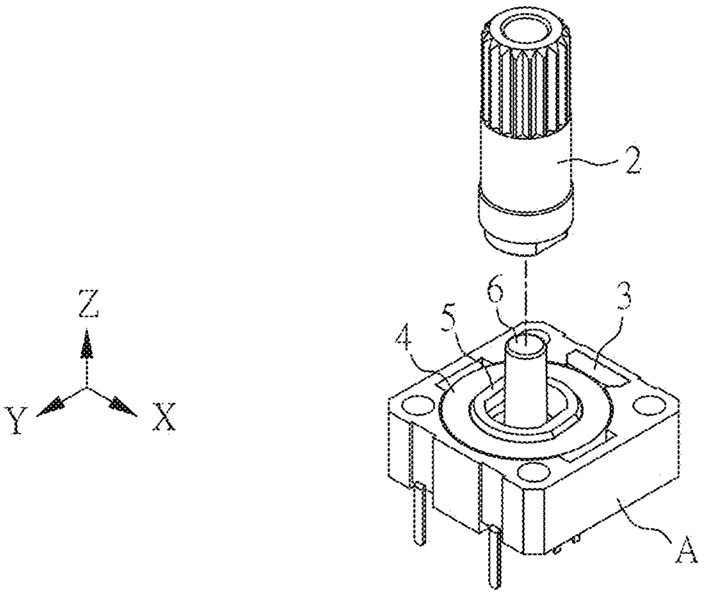
FIG. 3B is a schematic diagram of the combined magnetic ring, rotating driving body and control shaft according to an embodiment of the present disclosure.
Figure 3C:
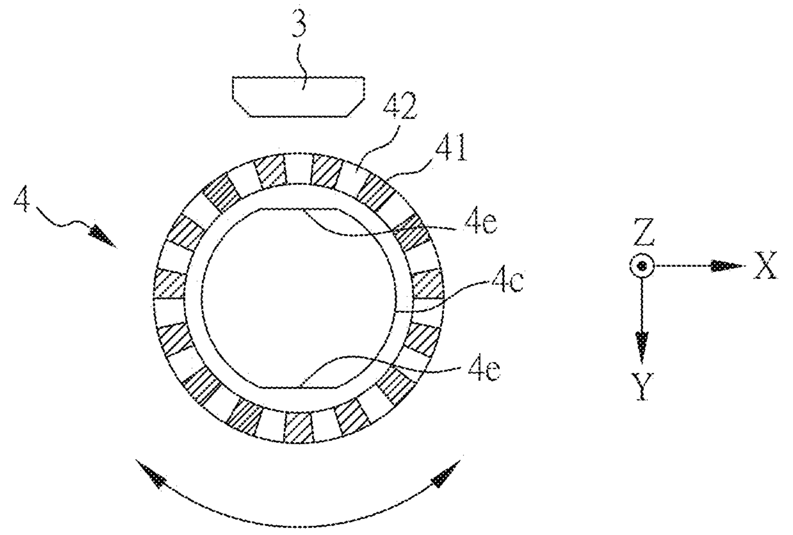
FIG. 3C is a top view of an encoder module according to an embodiment of the present disclosure.

As shown in FIG. 1, FIG. 3A and FIG. 3B, the projection of the outer circumference of the magnetic ring 4 in the Z direction may be, for example, a circle or a circle-like shape, while the projection of the inner circumference of the magnetic ring 4 in the Z direction may be, for example, an ellipse-like shape with two tangent sides 4*e*, but it is not limited thereto, and it may also be other shapes with two tangent sides 4*e*. In addition, as shown in FIG. 3C, in one embodiment, the magnetic ring 4 may be provided with a plurality of first magnetic polarities 41 (such as N polarities) and second magnetic polarities 42 (such as S polarities) arranged in a staggered manner. In one embodiment, the quantities of the first magnetic polarities 41 (N polarities) and the second magnetic polarities 42 (S polarities) are the same.

As shown in FIG. 1, FIG. 3A and FIG. 3B, the rotating driving body 5 has an upper surface 5*a*, wherein the upper surface 5*a* has a protruding structure 51, the protruding structure 51 extends along the Z direction, and a penetration hole 5S is disposed in protruding structure 51. In addition, in one embodiment, the rotating driving body 5 also has a toothed structure 52 disposed relative to the upper surface 5*a*, wherein the toothed structure 52 has a plurality of sub-teeth 53 arranged along the edge of the rotating driving body 5, and each sub-tooth 53 faces the −Z direction, for example, the tip of the sub-tooth 53 may be away from the upper surface 5*a*. In one embodiment, the shape of the sub-teeth 53 may be, for example, a triangle or a triangle-like shape, but may also be in other shapes, such as a semicircle, while it is not limited thereto. It should be noted that there may be a sub-teeth interval space 531 between adjacent sub-teeth 53.

Figure 5A:
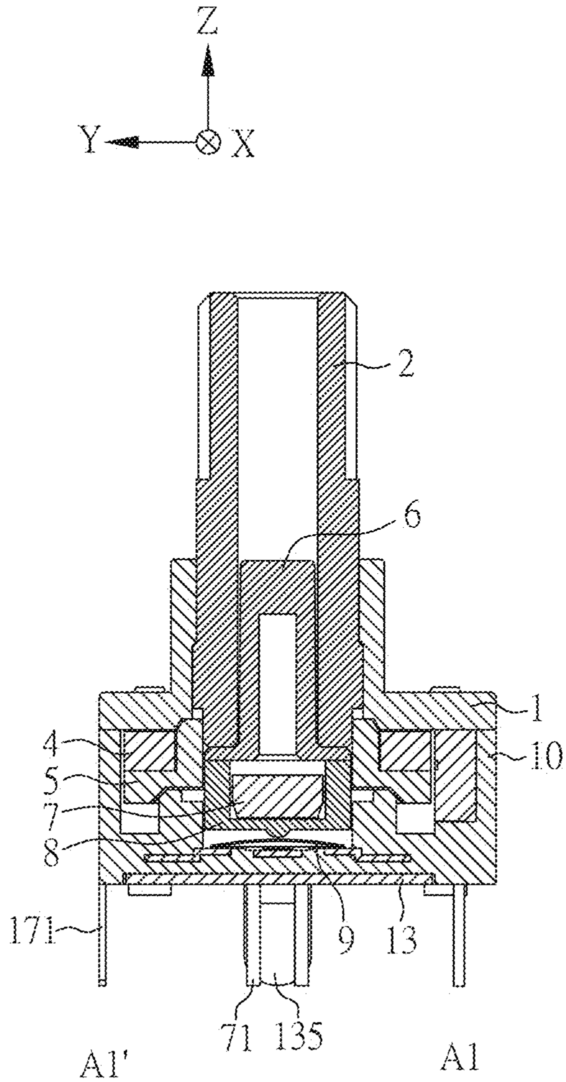
FIG. 5A is a cross-sectional view of an encoder with a light emitting diode taken along line A1-A1' of FIG. 4 before pressing the control shaft.

In one embodiment, the projection of the outer circumference of the rotating driving body 5 in the Z direction may be, for example, a circle or a circle-like shape. The projection of the outer circumference of the protruding structure 51 in the Z direction may be an ellipse-like shape with two tangent sides 5*e*, and may correspond to the shape and/or size of the inner circumference 4*c* of the magnetic ring 4, so that the magnetic ring 4 may be sleeved on the protruding structure 51 for tight engagement, so that the magnetic ring 4 and the rotating driving body 5 may be fixed together. In addition, the projection of the inner circumference of the protruding structure 51 (that is, the outline of the penetration hole 5S) in the Z direction may be an ellipse-like shape (or other shape) with two tangent sides 5*f*, and a bottom 21 of the control shaft 2 may correspond to the shape and/or size of the inner circumference 51*d* of the protruding structure 51, so that the bottom 21 of the control shaft 2 may pass through the penetration hole 5S, thereby allowing the control shaft 2 to drive the rotating driving body 5 to rotate in the horizontal direction. In addition, it should be noted that, in the vertical direction, through the structural shape matching between the control shaft 2 and the bearing 16 (as shown in FIG. 5A), the control shaft 2 may move in the Z direction.

As shown in FIG. 3C, when the encoder module B is placed on the insulating base 10, the magnetic sensor 3 may sense the magnetic polarity of the magnetic ring 4 and output a signal according to the sensed magnetic polarity of the magnetic ring 4. Therefore, when the control shaft 2 rotates, it may simultaneously drive the rotating driving body 5 and the magnetic ring 4 fixed on the rotating driving body 5 to rotate together, and the magnetic polarity sensed by the magnetic sensor 3 will also change following the rotation of the magnetic ring 4. As a result, the output of the magnetic sensor 3 may be controlled by rotating the control shaft 2 so as to be used as an encoder, but it is not limited thereto. In one embodiment, the encoder output may include one or more signal channels, but it is not limited thereto. In one embodiment, the magnetic sensor 3 may have one or more pins, while the quantity of pins is not limited.

Accordingly, the encoder module B can be understood.

Next, the diffusion member 6, bearing 16 and control shaft 2 of the encoder 1 with a light emitting diode will be described, and please refer to FIG. 1 again.

As shown in FIG. 1, in one embodiment, the encoder 1 with a light emitting diode may further include a diffusion member 6. The diffusion member 6 may be disposed on the light emitting diode 7, and the control shaft 2 may pass through the penetration hole 5S and be disposed above the diffusion member 6. The diffusion member 6 may be made of transparent material or at least partially transparent material, while it is not limited thereto. It should be noted that, in other embodiments, the encoder 1 with a light emitting diode may not be provided with the diffusion member 6.

In one embodiment, the encoder 1 with a light emitting diode may further include a bearing 16, and the bearing 16 has a through hole 16S. The bearing 16 may be sleeved on the control shaft 2 via the through hole 16S and disposed on the insulating base 10, wherein part of the control shaft 2 may be exposed outside the bearing 16. In addition, the control shaft 2 may be rotatable relative to the bearing 16. In one embodiment, the bearing 16 may have threads 161 for locking by tools (such as nuts) other than the present disclosure, but it is not limited thereto. In one embodiment, the bearing 16 may have an upper surface 16*a*, and the upper surface 16*a* is provided with one or more fixing holes 162, wherein the fixing holes 162 of the bearing 16 may be corresponding to the one or more fixing holes 106 of the insulating base 10 (shown FIG. 1 and FIG. 2A) and the one or more fixing holes 136 of the fixing plate 13 (shown in FIG. 1), so that the bearing 16, the insulating base 10 and the fixing plate 13 may be locked together through the fixing member 14, but it is not limited thereto.

In another embodiment, at least part of the control shaft 2 may be made of transparent material. Furthermore, the control shaft 2 may be made of a fully transparent material, and the type of the transparent material may include acrylic, PC, other suitable materials, or any combination of the above, while it is not limited thereto. Alternatively, the control shaft 2 may also be a partially transparent and partially opaque structure, for example, partially made of metal and partially made of transparent material, while it is not limited thereto. Therefore, the light emitted by the light emitting diode 7 may be emitted to the outside via the control shaft 2. In addition, as shown in FIG. 5A, in another embodiment, the control shaft 2 may be made of an opaque material. In this case, the inside of the control shaft 2 may be a hollow structure, so that the light emitted by the light emitting diode 7 may pass through the hollow structure for being spread out, while it is not limited thereto.

Figure 4:
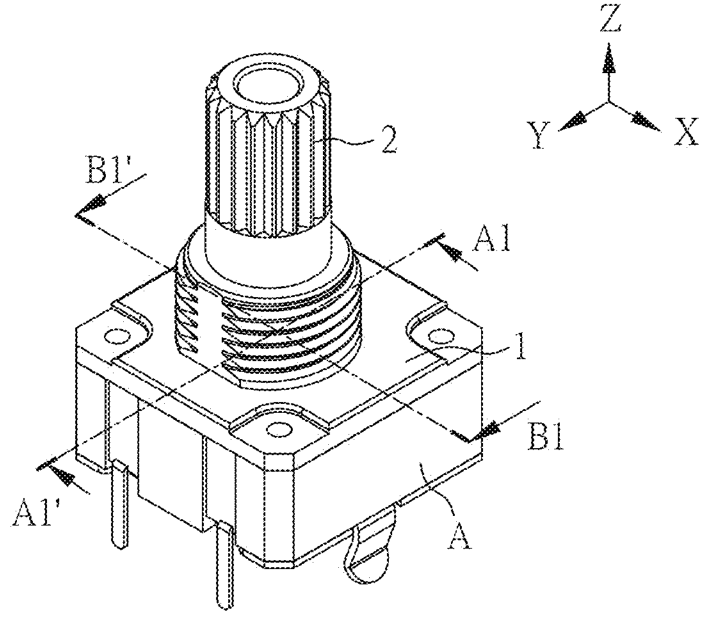
FIG. 4 is a schematic diagram illustrating an assembled encoder with a light emitting diode according to an embodiment of the present disclosure.

FIG. 4 is a schematic diagram illustrating the assembled encoder 1 with a light emitting diode according to an embodiment of the present disclosure, and please also refer to FIG. 1 to FIG. 3C as a reference.

In one embodiment, when the encoder 1 with a light emitting diode is disposed on a circuit board (not shown), the pins 71 (shown in FIG. 2A) of the light emitting diode 7 may be electrically connected to the external circuit (not shown) of the circuit board for being controlled by the external circuit to emit light and adjust the light color, while it is not limited thereto.

Figure 5B:
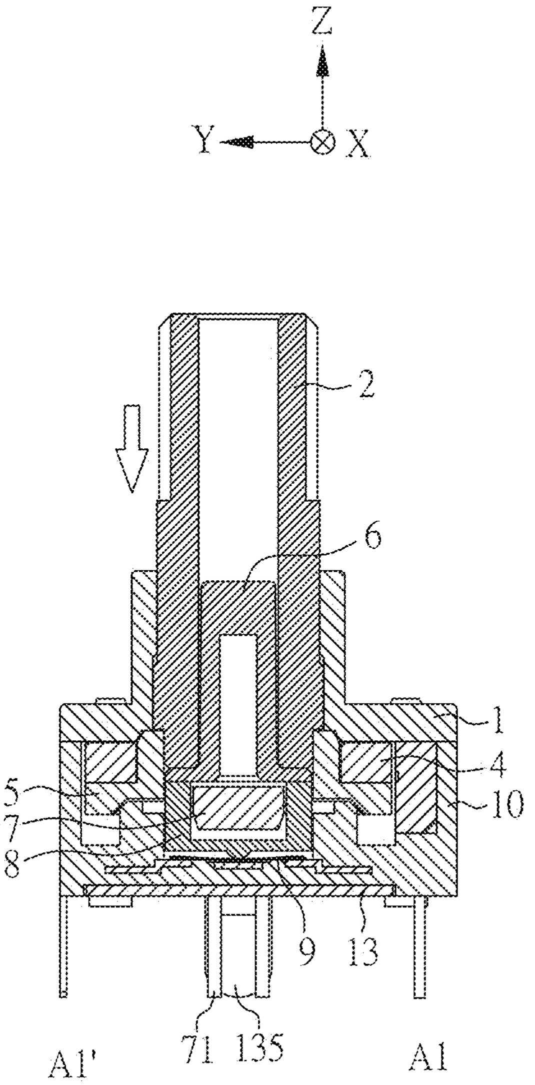
FIG. 5B is a cross-sectional view of an encoder with a light emitting diode taken along line A1-A1' of FIG. 4 after pressing the control shaft.

Next, the operation of the encoder 1 with a light emitting diode serving as a push switch will be described, and please refer to FIG. 1, FIG. 5A and FIG. 5B at the same time. FIG. 5A is a cross-sectional view of the encoder 1 with a light emitting diode taken along line A1-A1' of FIG. 4 before pressing the control shaft 2 according to an embodiment of the present disclosure, and FIG. 5B is a cross-sectional view of the encoder 1 with a light emitting diode taken along line A1-A1' of FIG. 4 after pressing the control shaft 2 according to another embodiment of the present disclosure, wherein FIG. 5A shows the situation before the switch is pressed, and FIG. 5B shows the situation after the switch is pressed. In addition, FIG. 5A and FIG. 5B are cross-sections formed corresponding to line A1-A1' in FIG. 4.

As shown in FIG. 5A and FIG. 5B, when an external force is applied to the control shaft 2 so that the control shaft 2 moves toward the pressing driving body 8, the control shaft 2 may resist the diffusion member 6 and, after receiving force, the diffusion member 6 may resist the pressing driving body 8 (if the encoder 1 does not have the diffusion member 6, for example, it may be designed so that the control shaft 2 directly resists the pressing driving body 8). The pressing driving body 8 may resist the conductive elastic piece 9 after receiving force, and the conductive elastic piece 9 moves downward after receiving force to achieve electrical connection between the first terminal 17 and the second terminal 18, thereby achieving the turn-on function of the switch. In one embodiment, the conductive elastic piece 9 may be designed to contact one of the first terminal 17 and the second terminal 18 before receiving force and not to contact the other one, and the conductive elastic piece 9 will be in contact with the other one of the first terminal 17 and the second terminal 18 after receiving force, while it is not limited thereto. In another embodiment, the conductive elastic piece 9 may also be designed not to contact the first terminal 17 and the second terminal 18 before receiving force, and to contact the first terminal 17 and the second terminal 18 after receiving force, while it is not limited thereto. In addition, when the external force applied to the control shaft 2 is removed, the conductive elastic piece 9 may bounce up through its own elastic force and resume to its original shape or original position, so that the first terminal 17 and the second terminal 18 return to an electrical disconnection state, thereby achieving the turn-off function of the switch.

Figure 6:
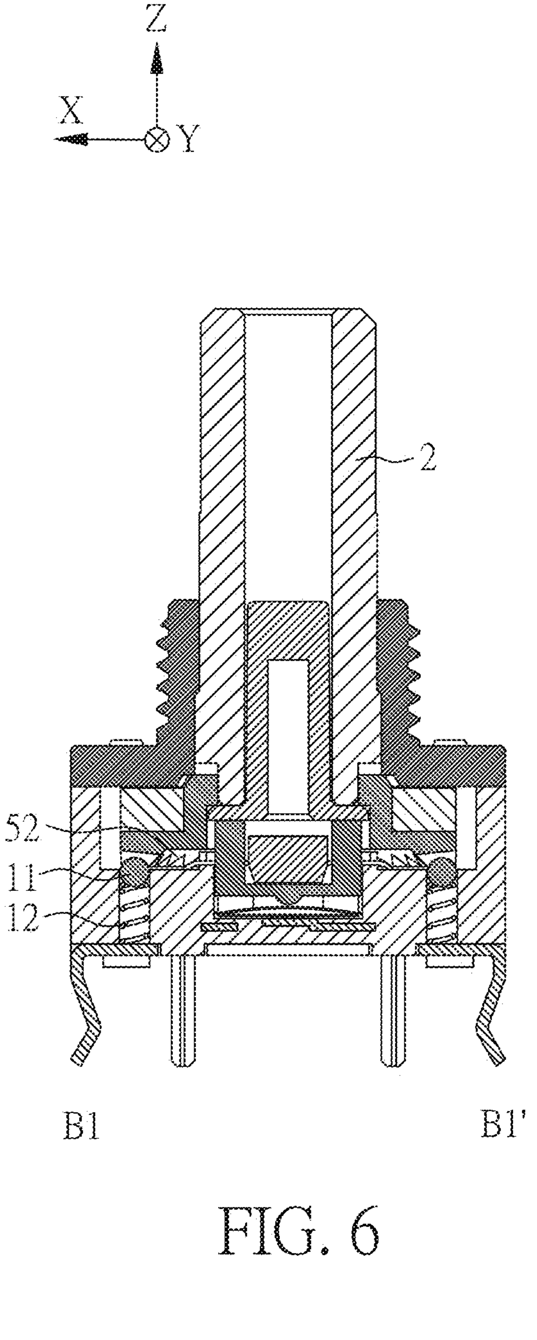
FIG. 6 is a cross-sectional view of an encoder with a light emitting diode taken along line B1-B1' of FIG. 4.

Next, please refer to FIG. 4 to FIG. 6, wherein FIG. 6 is a cross-sectional view of the encoder 1 with a light emitting diode taken along line B1-B1' according to an embodiment of the present disclosure, which corresponds to the cross-section formed by line B1-B1' of FIG. 4. As shown in FIG. 6, the steel ball 11 may be correspondingly disposed below the toothed structure 52 of the rotating driving body 5, and the spring 12 may be disposed below the steel ball 11. In one embodiment, when the rotating driving body 5 rotates, the toothed structure 52 may rotate in the horizontal direction and, during the rotation, the steel ball 11 may contact the sub-teeth 53 of the toothed structure 52 or be disposed in the in the sub-teeth interval space 531. When the steel ball 11 is in contact with the tip of the sub-tooth 53 of the toothed structure 52, the steel ball 11 is pushed by the sub-tooth 53 and, at this moment, the spring 12 is also squeezed and deformed by the steel ball 11. When the steel ball 11 is not in contact with the sub-tooth 53 or disposed in the sub-teeth interval space 531, the spring 12 may be released and resumed from the deformed state. With the change of the elastic potential energy of the spring 12, the steel ball 11 may impact the rotating driving body 5, thereby providing the user with a continuous clicking feel, such as an operating feel similar to the vibration of a ratchet wrench. As a result, the rotation process may be turned into a staged rotation. Through the feedback of the magnitude of the vibration frequency, the operator may be aware of the speed of the rotation of the control shaft 2.

Figure 7:
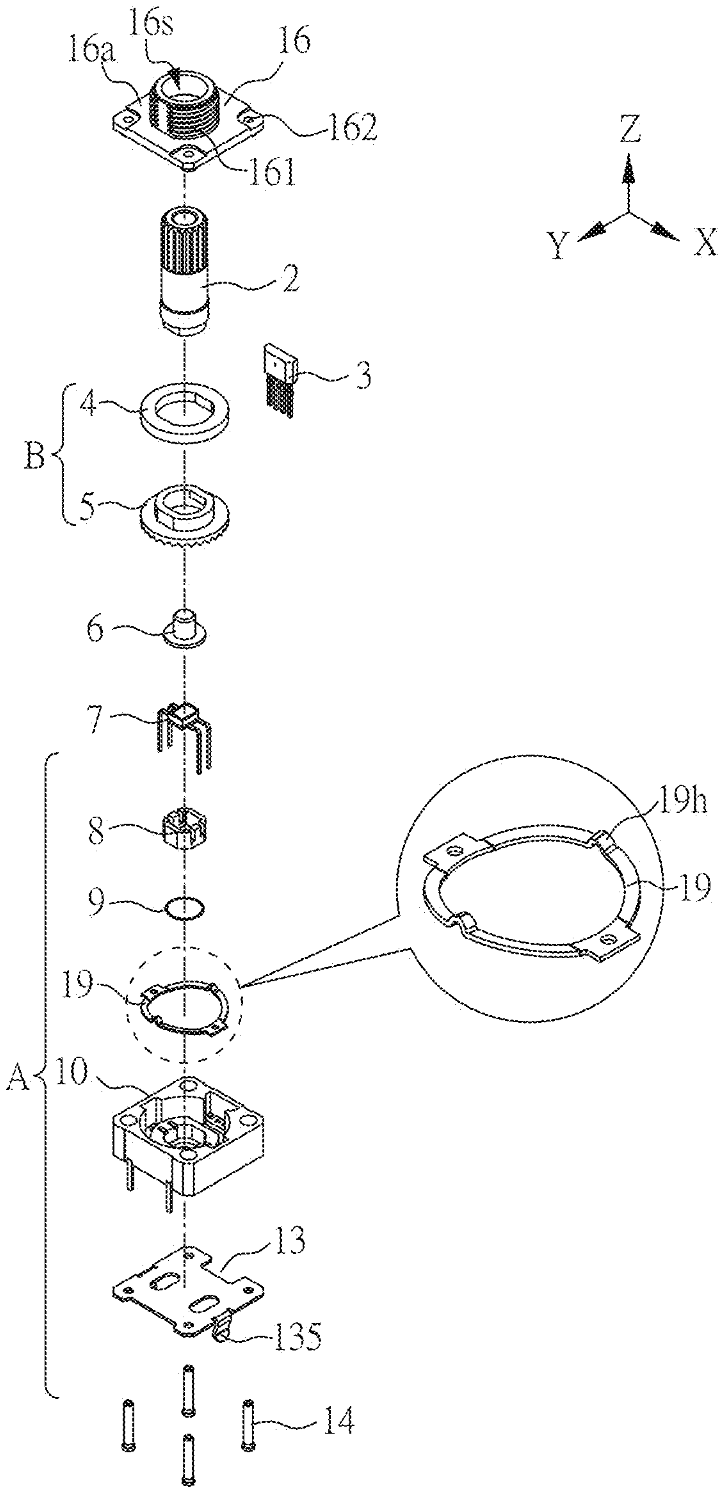
FIG. 7 is an exploded view of an encoder with a light emitting diode according to another embodiment of the present disclosure.

The present disclosure may also achieve the above functions through other designs. FIG. 7 is an exploded view of an encoder 1 with a light emitting diode according to another embodiment of the present disclosure, and please also refer to FIG. 1 to FIG. 6 at the same time, wherein most features of the embodiment of FIG. 7 may be applied to the description of the embodiment of FIG. 1, and thus the following description mainly focuses on the differences.

In the embodiment of FIG. 7, the encoder 1 with a light emitting diode may not have a steel ball 11 or a spring 12, but may have an annular elastic piece 19. The annular elastic piece 19 may be disposed in the insulating base 10, and the rotating driving body 5 may be disposed above the annular elastic piece 19. The annular elastic piece 19 is provided with at least one protruding portion 19*h*. The protruding portion 19*h* may be disposed corresponding to the toothed structure 52. Therefore, when the rotating driving body 5 does not rotate, the protruding portion 19*h* may be disposed in the sub-teeth interval space 531 between adjacent sub-teeth 53 and, when the rotating driving body 5 rotates, the protruding portion 19*h* may slide into the sub-teeth interval space 531 between another pair of adjacent sub-teeth through the pushing of the sub-teeth 53. As a result, the effects of the steel ball 11 and spring 12 in the embodiment of FIG. 6 may also be produced (for example, feedback of operating feel).

In addition, in one embodiment, if the aforementioned functions, such as the feedback operating feel, are not needed, the aforementioned steel ball 11, spring 12 or annular elastic piece 19 and other related components may also be removed, or the toothed structure 52 of the rotating driving body 5 may be directly removed, but it is not limited thereto.

Therefore, it can be seen that, in the present disclosure, the switch module A, the encoder module B and the light emitting diode 7 are integrated into one body, and are operated independently to provide the functions of light emission of different mixed colors, switch and encoder at the same time, which can simplify the structural design and manufacturing process and achieve the purpose of being thin and light. In addition, the encoder module B of the present invention adopts non-contact magnetic induction technology, which can greatly increase the service life. In addition, the insulating base 10 of the present disclosure may be provided with a steel ball 11 and a spring 12, or may be equipped with an annular elastic piece 19, so that, when combined with the rotating driving body 5, a feedback effect of the user operating feel may be provided.

In one embodiment, the present disclosure may at least compare a product through mechanism observation, such as the presence or absence of components or the operational relationship between components for use as a basis to determine whether the product falls within the patent protection scope of the present disclosure, but not limited thereto. In one embodiment, the mechanism observation may be achieved, for example, by using equipment such as an optical microscope or a scanning microscope, but it is not limited thereto.

Accordingly, the present disclosure can be understood.

The aforementioned specific embodiments should be construed as merely illustrative, and not limiting the rest of the present disclosure in any way.

The invention claimed is:

1. An encoder, comprising:
- a light emitting diode;
- a switch module, including:
  - an insulating base having a main chamber and a terminal part;
  - a conductive elastic piece accommodated in the main chamber and disposed above the terminal part; and
  - a pressing driving body accommodated in the main chamber and disposed above the conductive elastic piece, and provided with an accommodation portion for accommodating the light emitting diode;
  - an encoder module at least partially accommodated in the main chamber, and provided with a magnetic sensor, a magnetic ring, and a rotating driving body having a penetration hole; and
  - a control shaft passing through the penetration hole and disposed above the pressing driving body;
  - wherein the control shaft drives the rotating driving body to rotate in the horizontal direction, and the magnetic ring is fixed on an outer surface of the rotating driving body.

2. The encoder as claimed in claim 1, wherein the magnetic ring has a plurality of first magnetic polarities and a plurality of second magnetic polarities arranged in a staggered manner.

3. The encoder as claimed in claim 2, wherein the insulating base further includes a side chamber adjacent to the main chamber, and the magnetic sensor is disposed in the side chamber.

4. The encoder as claimed in claim 3, wherein the magnetic sensor outputs a signal according to the magnetic polarity of the magnetic ring facing to and sensed by the magnetic sensor.

5. The encoder as claimed in claim 1, further comprising a bearing having a through hole, wherein the bearing is sleeved on the control shaft via the through hole and disposed on the insulating base.

6. The encoder as claimed in claim 1, wherein the control shaft is a hollow structure, or at least part of the control shaft is made of a transparent material.

7. The encoder as claimed in claim 1, wherein the insulating base is further provided with at least one steel ball and at least one spring, the at least one steel ball is correspondingly disposed below a toothed structure of the rotating driving body, and the at least one spring is disposed below the at least one steel ball; or the switch module further includes an annular elastic piece disposed in the insulating base, the rotating driving body is disposed above the annular elastic piece, and a protruding portion of the annular elastic piece is disposed corresponding to the toothed structure of the rotating driving body.

8. The encoder as claimed in claim 1, wherein the terminal part includes a first terminal and a second terminal that are not connected to each other.

9. The encoder as claimed in claim 8, wherein, when the control shaft moves toward the pressing driving body, the pressing driving body resists the conductive elastic piece so that the conductive elastic piece achieves electrical connection of the first terminal and the second terminal.

10. The encoder as claimed in claim 9, further comprising a diffusion member disposed on the light emitting diode for resisting the pressing driving body.

11. The encoder as claimed in claim 10, wherein the diffusion member is made of a transparent material or at least part of the diffusion member is made of a transparent material.

12. The encoder as claimed in claim 1, wherein the pressing driving body has an accommodation portion corresponding to a shape of the light emitting diode for accommodating the light emitting diode and, when the light emitting diode is accommodated in the pressing driving body, a pin of the light emitting diode is exposed on a bottom of the switch module for being electrically connected to a circuit board.

13. The encoder as claimed in claim 1, further comprising a fixing plate attached to the insulating base, and the fixing plate has at least one lead to enable a body of the encoder to be positioned on a counterpart.

14. The encoder as claimed in claim 13, further comprising a fixing member, and a bearing provided with one or more fixing holes, wherein the one or more fixing holes of the bearing correspond to one or more fixing holes of the insulating base and one or more fixing holes of the fixing plate, so that the bearing, the insulating base and the fixing plate are locked together through the fixing member.

* * * * *